United States Patent [19]

Naruse et al.

[11] Patent Number: 4,857,967
[45] Date of Patent: Aug. 15, 1989

[54] LIGHT SOURCE DEVICE

[75] Inventors: Kazuhiko Naruse; Hidetoshi Yasumoto, both of Osaka, Japan

[73] Assignee: Minolta Camera Kabushiki Kaisha, Osaka, Japan

[21] Appl. No.: 156,424

[22] Filed: Feb. 16, 1988

[30] Foreign Application Priority Data

Feb. 16, 1987 [JP] Japan ................... 62-34738

[51] Int. Cl.⁴ .............................................. G03B 27/72
[52] U.S. Cl. ........................................ 355/69; 355/77; 355/68
[58] Field of Search ............... 355/68, 69, 14 R, 14 E, 355/38, 77

[56] References Cited

U.S. PATENT DOCUMENTS

| | | | |
|---|---|---|---|
| 3,887,279 | 6/1975 | Rubin | 355/38 |
| 4,272,183 | 6/1981 | Maese et al. | 355/14 R |
| 4,551,011 | 11/1981 | Yuasa et al. | 354/145.1 X |
| 4,608,522 | 8/1986 | Yuasa et al. | 355/69 X |
| 4,693,589 | 9/1987 | Watanabe et al. | 355/77 |
| 4,704,025 | 11/1987 | Yuasa et al. | 355/38 |
| 4,711,569 | 12/1987 | Nishimori et al. | 355/69 |

Primary Examiner—L. T. Hix
Assistant Examiner—D. Rutledge
Attorney, Agent, or Firm—Price, Gess & Ubell

[57] ABSTRACT

In a light source device in which one or more light emitting tubes are adapted to emit light sequentially, there are provided one or more counters for counting the number of times of failure of light emission of the light emitting tubes, and comparator or judging circuit for comparing the number counted by the counters with a predetermined number to produce an interruption signal when the counted number is over the predetermined value, a control unit acts to interrupt the light emission of the light emitting tube in response to the interruption signal and a warning device is activated for indicating a warning in response to the interruption signal.

9 Claims, 2 Drawing Sheets

LIGHT SOURCE DEVICE

BACKGROUND OF THE INVENTION

1. Field of the Invention

The present invention relates to a light source device having a life detection device for detecting the end of useful life of a light source such as Xenon tube used in a photographic enlarger or the like.

2. Description of the Prior Art

A light sources device for use in an enlarger having one or more light source such as Xenon tubes is well known. In the above type of the light source, the Xenon tubes are sequentially driven to emit light in a controlled manner so that a desired light value is emitted. The above type of the light source is disclosed in the U.S. Pat. No. 4,551,011 in which the device is used in an enlarger the number of light emission and each emitted light amount is determined such that the exposure time is approximately the same regardless of the total amount of exposure. In the light source mentioned above, if one of the Xenon tubes fails in emitting light due to end of its useful life of the Xenon tube, there will occur a discontinuation of light from the light source, whereby the exposure of the enlarger is incomplete and a good photographic print can not be obtained.

Conventional light source devices, however, can not detect such failure of light emission of the Xenon tube. In the case where the light source device with the inoperative tube installed is repeatedly used, not only the quality of the photographic print is deteriorated due to discontinuation of light but also a Xenon tube drive circuit would be damaged.

SUMMARY OF THE INVENTION

An essential object of the present invention is to provide a light source device which is capable of automatically detecting failure of light emission and automatically warning of the inoperativeness of the light source.

According to the present invention, there is provided a light source device comprising: means, including at least one Xenon tube, for emitting light; means for successively energizing the Xenon tube for a plurality of successive light emissions; means for measuring the amount or intensity of light emitted by the Xenon tube at each light emission; means for discriminating whether or not the amount or intensity of light measured by the measuring means reaches a predetermined level; means for counting the number of times in which the discriminating means discriminates that the amount or intensity of light measured by the measuring means does not reach a predetermined level; means for comparing the number counted by the counting means with a predetermined number to produce an interruption signal when the counted number is over the predetermined level; means for interrupting the light emission of the Xenon tube in response to the interruption signal; and means for indicating a warning in response to the interruption signal.

DETAILED DESCRIPTION OF THE PREFERRED EMBODIMENTS

Figure 1:
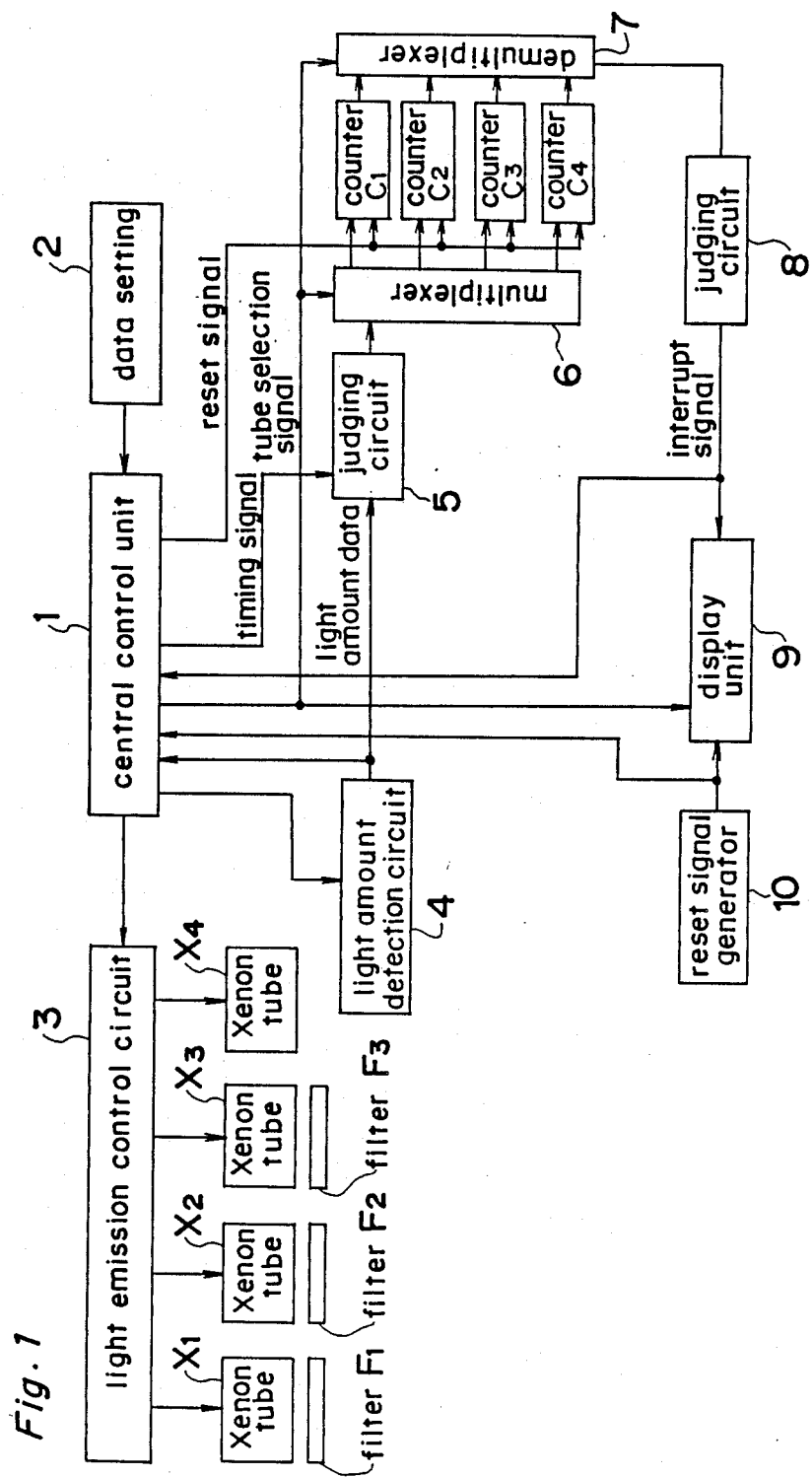
FIG. 1 is a block diagram showing a preferred embodiment of a light emitting device including a light source life detecting device according to the present invention.

Referring to FIG. 1, there are provided a central control unit 1 for controlling the light emitting device, a light amount setting unit 2 for manually setting a desired light amount data to be emitted and a light emission control circuit 3 for controlling one or more of light sources X so as to emit a plurality of repetitive light pulses based on the control signal applied from the central control unit 1. As the light sources X, in the present example, there are provided four Xenon tubes X1, X2, X3 and X4 in which the Xenon tubes X1, X2 and X3 are attached with red, green and blue light filters F1, F2 and F3 so as to emit red light, green light and blue light respectively. The Xenon tube X4 is used without filter so as to emit white light which may be used for continuously illuminating a film to be enlarged during a focusing condition of an enlarging lens is being adjusted in case the light emitting device is used as an enlarger. The Xenon tubes X1 to X3 are used for exposure to printing papers.

There is a further provided a light amount detection circuit 4 for detecting the amount of light emitted from the light source X every time the light source emits light. The data obtained by the light amount detection circuit 4 is transferred to the central control unit 1 and the total light amount emitted by the light source X is calculated therein. When the total light amount reaches a predetermined set value, the light emission control circuit 3 acts to interrupt the excitation of the Xenon tubes.

In order to detect the end of the useful life of the Xenon tubes X1 to X4, there is provided a judging circuit 5 adapted to receive the light amount data fed from the light amount detection circuit 4 and a timing signal from the central control unit 1, whereby the judging circuit 5 judges whether any one of the Xenon tubes X1 to X4 actually emits light at every period of light emitting timing. A multiplexer 6 is provided to receive the output signals of the judging circuit 5 and the output terminals of the multiplexer 6 are connected to counters C1 to C4 each provided corresponding to the Xenon tubes X1 to X4 and in turn the output terminals of the respective counters C1 to C4 are connected with a demultiplexer 7. By this arrangement, when it is detected that any one of the Xenon tubes X1 to X4 fails to emit light, the signal representing the failure of the light emission is applied to any one of the counters C1 to C4, which count the respective number of times of the failure of the light emission of the corresponding Xenon tubes X1 to X4. The contents of the respective counters C1 to C4 are reset by the reset signal fed from the central control unit 1 when exposure or focus adjustment of the enlarger are executed. The demultiplexer 7 is provided for selectively reading out the contents of any of the counters C1 to C4 according to the tube selection signal.

A second judging circuit 8 is provided for receiving the output signal from the demultiplexer 7 for judging whether or not the content of each of counters C1 to C4 exceeds a predetermined value, that is the second judging circuit 8 judges whether or not the number of failure of light emission of each of the Xenon tubes X1 to X4 exceeds the predetermined value. When the number of failure of the light emission of any one of the Xenon tubes X1 to X4 exceeds the predetermined value, the second judging circuit 8 generates an interruption signal which is fed to a display unit 9 and the central control unit 1. The display unit 9 displays the name of any one of the Xenon tubes which the life has been lapsed. 10 denotes a reset signal generator for providing a reset signal to the display unit 9 and central control unit 1 to reset them.

Assuming that the central control unit 1 produces a signal to turn on the respective Xenon tubes X1, X2 and X3 in turn sequentially but only one Xenon tube is turned on at a time, the respective light amount emitted by the respective Xenon tubes X1 to X3 is measured by the light amount detection circuit 4, and the total light amount of the respective Xenon tubes X1 to X3 is calculated in the central control unit 1. In the mean time, it is detected whether or not each of the Xenon tubes X1 to X4 correctly emit light by the judging circuit 5 by judging the light amount fed from the light amount detection circuit 4 at the time when the timing signal is applied to the judging circuit 5. In case each of the Xenon tubes X1 to X3 emits light correctly, the judging circuit 5 does not produce an output signal. When the total light amount reaches a predetermined value set by the setting unit 2, the central control unit 1 gives an output to the light emitting control circuit 3 to interrupts the excitation of the Xenon tubes X1 to X3.

On the other hand, in case any one of the Xenon tubes X1 to X3 (for example X1) fails to emit light because of, for example, the end of its useful life, the light amount of the Xenon tube X1 detected by the light amount detection circuit 4 is less than the predetermined value, the judging circuit 5 generates a pulse to the multiplexer 6. Since the multiplexer 6 receives, from the central control unit 1, the tube selection signal representing which of the Xenon tube is now driven, therefore in this case, since the Xenon tube X1 is now driven, the output pulse of the multiplexer 6 is applied to the counter C1, which increases the content 1. In the same manner as described above, if failure of light emission occur at the Xenon tubes X2 and/or X3, the failure of the light emission is counted by the counter C2 and/or C3. In the manner as mentioned above, the number of failures of light emission at each Xenon tube is counted by the counters C1 to C3. Then the content of the counters C1 to C3 is read out for each Xenon tube by the demultiplexer 7 and applied to the second judging circuit 8. When the content of the counter, for example, the content of the counter C1, exceeds the predetermined value, the second judging circuit 8 detects this fact and generates an interrupt signal to the display unit 9 and central control unit 1, whereby the central control unit 1 interrupts the excitation of the Xenon tubes X1 to X3 to interrupt light emission. On the other hand, the display unit 9 displays which Xenon tube reaches the end of its useful life by the interrupt signal and the tube selection signal fed from the central control unit 1.

In case the light emission is interrupted due to the end of the useful life of the Xenon tube, the tube or tubes which have reached the end of their useful life should be replaced by good tubes. After the good tubes are mounted, the reset signal generator 10 generates the reset signal by operating a reset button (not shown), and therefore the content displayed on the display unit 9 is cleared off and the light emitting device recovers its operative condition. In this case, it is possible to select either to continue the previous light emission or to perform light emission from an initial condition by the selection generated from the central control unit 1.

In case the Xenon tube X4 is driven to emit light for the focus control, a similar operation to detect the end of the useful life of the tube mentioned above is performed for the Xenon tube X4 and when failure of light emission occurs, the counter C4 corresponding to the Xenon tube X4 counts the number of failures of light emission. It is noted that in case of the focus control, since an accurate light amount detection is unnecessary, it is possible to neglect the data of the amount of light from the light amount detection circuit 4, whereby it is possible to make the interval of the light emission from the Xenon tube X4 short.

Figure 2:
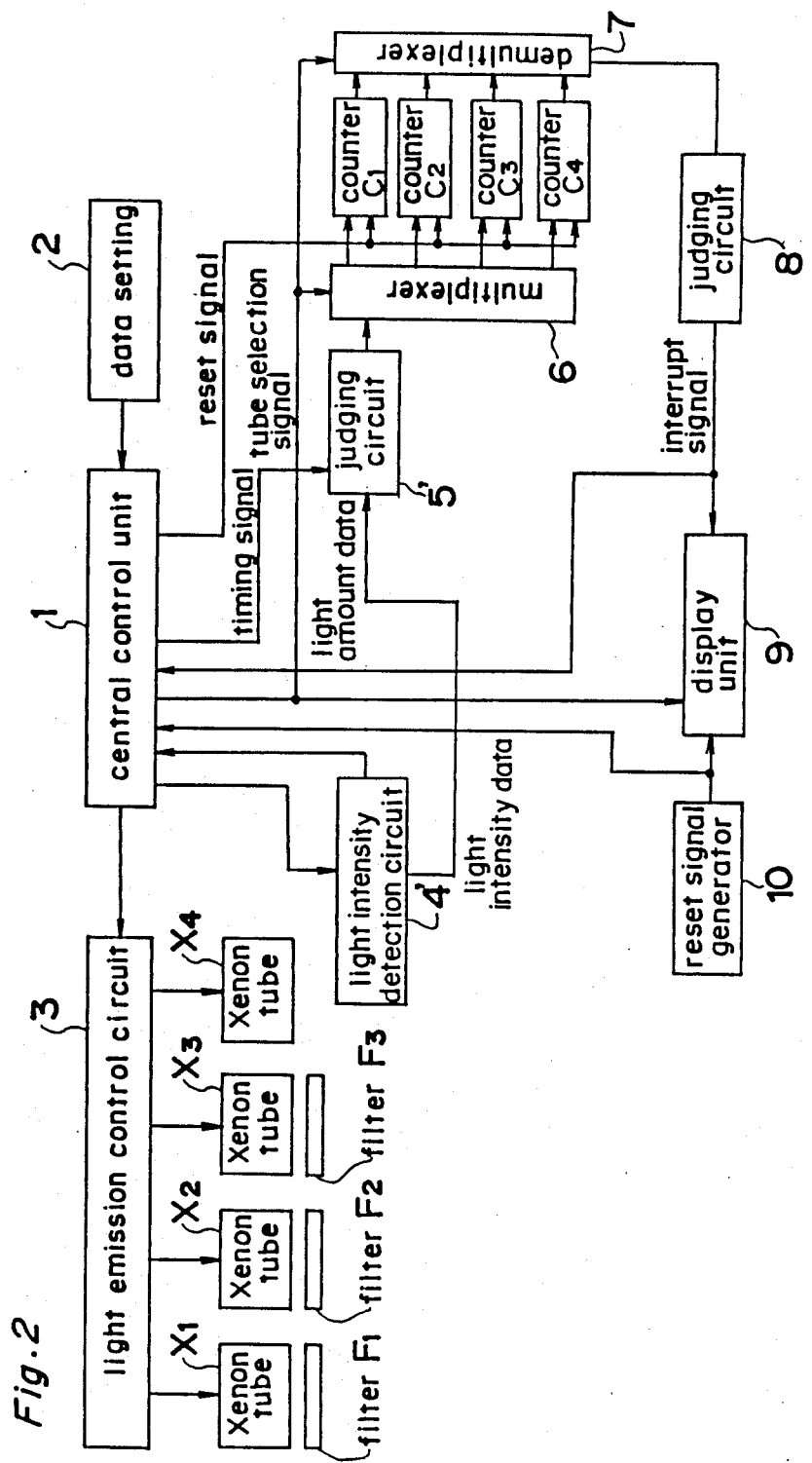
FIG. 2 is a block diagram showing another embodiment of a light emitting device including a light source life detecting device according to the present invention.

FIG. 2 shows another embodiment of the present invention in which a light intensity detection circuit 4' generates light signals each corresponding to intensity of light emitted from the light source X every time the light source emits light, and the light intensity data are sent to the judging circuit 5 which compares the level of each of the light intensity data with a predetermined value and generates the output signal when the level of the light intensity data is lower than the predetermined value.

Although the number of the Xenon tubes is four in the respective embodiments, the number of the tubes may be selected as desired and the counters are provided corresponding to the respective tubes.

As mentioned above, in the preferred embodiment of the light source device according to the present invention, the number of failure of light emission from the tubes is counted and when the counted value exceeds a predetermined value, the light source device is automatically stopped and a warning is generated. Whereby it is possible to know the useful life of the tube has expired and to avoid using the light source device with a failure of light emission, whereby it is possible to prevent erroneous exposure.

Although the present invention has been fully described by way of example with reference to the accompanying drawings, it is to be noted here that various changes and modifications will be apparent to those skilled in the art. Therefore, unless otherwise such changes and modification depart from the scope of the present invention, they should be construed as being included therein.

What is claimed is:

1. An exposure light source device comprising:
   means, including at least one Xenon tube, for emitting exposure light;
   means for successively energizing the Xenon tube for a plurality of successive light emissions;
   means for measuring the amount or intensity of light emitted by the Xenon tube at each light emission;
   means for discriminating whether or not the amount or intensity of light measured by the measuring means reaches a predetermined level;
   means for counting the number of times in which the discriminating means discriminates that the amount or intensity of light measured by the measuring means does not reach a predetermined level;
   means for comparing the number counted by the counting means with a predetermined number to produce an interruption signal when the counted number is over the predetermined level;
   means for interrupting the light emission of the Xenon tube in response to the interruption signal; and means for indicating a warning in response to the interruption signal.

2. The light source device as claimed in claim 1, wherein the light emitting means includes a plurality of Xenon tubes and the counting means includes a plurality of counters each corresponding to each Xenon tube respectively, and further comprising, means for selecting one of the plurality of Xenon tubes for the light emission, means for selecting one of the counters which corresponds to the selected Xenon tube, and means for indicating the selected Xenon tube in response to the interruption signal.

3. The light source device as claimed in claim 2, wherein the light emitting means further includes a plurality of color filters each corresponding to each Xenon tube respectively.

4. The light source device as claimed in claim 3, wherein the selected Xenon tube indicating means includes means for displaying the color of the color filter corresponding to the selected Xenon tube.

5. The light source device as claimed in claim 1, further comprising means for resetting the counted number of the counting means prior to the start of the light emission of the Xenon tube.

6. The light source device as claimed in claim 1, further comprising means for clearing the warning indicated by the warning indicating means in response to an external operation, and means for resetting the interrupting means in response to the external operation.

7. The light source device as claimed in claim 1, wherein the device is incorporated with a photographic enlarger.

8. The light source device as claimed in claim 1, wherein the warning indicating means includes means for indicating a termination of life of the Xenon tube.

9. In a photographic enlarger having a plurality of individual light sources that can be repetitively activated to produce a desired exposure, the improvement comprising:

means for measuring the number of times an exposure light is emitted by each of the respective light sources and for producing a corresponding signal for each respective exposure light source;

means for comparing the measured signals with a predetermined value and for providing an interruption signal when the measured signal does not match the predetermined exposure value;

means for interrupting the activation of the exposure light source, and means for indicating the specific exposure light source that has failed.

* * * * *